(12) United States Patent
Aarnio

(10) Patent No.: US 6,873,688 B1
(45) Date of Patent: Mar. 29, 2005

(54) METHOD FOR CARRYING OUT QUESTIONNAIRE BASED SURVEY IN CELLULAR RADIO SYSTEM, A CELLULAR RADIO SYSTEM AND A BASE STATION

(75) Inventor: Leila Aarnio, Turku (FI)

(73) Assignee: Oy Riddes Ltd., Turku (FI)

( * ) Notice: Subject to any disclaimer, the term of this patent is extended or adjusted under 35 U.S.C. 154(b) by 0 days.

(21) Appl. No.: 10/089,219
(22) PCT Filed: Oct. 2, 2000
(86) PCT No.: PCT/FI00/00847
§ 371 (c)(1), (2), (4) Date: Jul. 8, 2002
(87) PCT Pub. No.: WO01/24078
PCT Pub. Date: Apr. 5, 2001

(30) Foreign Application Priority Data

Sep. 30, 1999 (FI) .............................. 19992100
Sep. 30, 1999 (FI) .............................. 19992101
Sep. 30, 1999 (FI) .............................. 19992102

(51) Int. Cl.[7] ............................................ H04M 11/00
(52) U.S. Cl. ............................... 379/92.02; 379/92.04; 379/92.01; 455/2.01
(58) Field of Search ........................... 379/92.02, 92.04, 379/90.01, 88.08, 88.11, 88.26, 92.01, 92.03; 455/2.01, 456; 705/10; 707/1

(56) References Cited

U.S. PATENT DOCUMENTS

| | | | | |
|---|---|---|---|---|
| 4,689,619 A | * | 8/1987 | O'Brien, Jr. ........... | 340/825.08 |
| 5,382,970 A | | 1/1995 | Kiefl | |
| 5,496,175 A | | 3/1996 | Oyama et al. | |
| 5,842,195 A | | 11/1998 | Peters et al. | |
| 6,223,291 B1 | * | 4/2001 | Puhl et al. ................ | 713/201 |
| 6,324,266 B1 | * | 11/2001 | Mannings ................ | 379/92.04 |

FOREIGN PATENT DOCUMENTS

| | | |
|---|---|---|
| DE | 3233114 | 3/1984 |
| EP | 0 606 703 A1 | 7/1994 |
| WO | WO 95/15065 | 6/1995 |
| WO | WO 98/24238 | 6/1998 |

OTHER PUBLICATIONS

Giniger et al.; Method and Apparatus . . . to mobile recepients; Feb. 26, 1998; WO 98/08314.*
Ijungqvist et al.; Method and Device for interaction: Nov. 19, 1998; WO98/52340.*

* cited by examiner

Primary Examiner—Melur Ramakrishnaiah
(74) Attorney, Agent, or Firm—Nixon & Vanderhye P.C.

(57) ABSTRACT

The invention relates to making a questionnaire-based survey in a cellular radio system including a central device and a number of independent terminal devices, where between the terminal devices and the central device, data transmission connections can be made. In the method, the central device receives an inquiry message and/or an inquiry table from the terminal device of the researcher, said message defining the survey group that the inquiry message relates to. The central device investigates which predetermined terminal device group and/or inquiry table stored in the central device the received inquiry message relates to, and transmits a notice of the received inquiry message, or at least part of the received inquiry message, and/or a questionnaire to those terminal devices that belong in the terminal device group that the received inquiry message relates to. The central device receives a questionnaire request from at least part of the terminal devices that received the message, but did not receive the questionnaire, and transmits the questionnaires to the requesting terminal devices, whereafter it receives an answer message responding to the questionnaire from at least part of the terminal devices that received the questionnaire and transmits at least part of the contents of the received answer messages to the terminal device of the researcher. Further, the invention relates to a cellular radio system and a central device used in the method.

14 Claims, 1 Drawing Sheet

Figure 1:
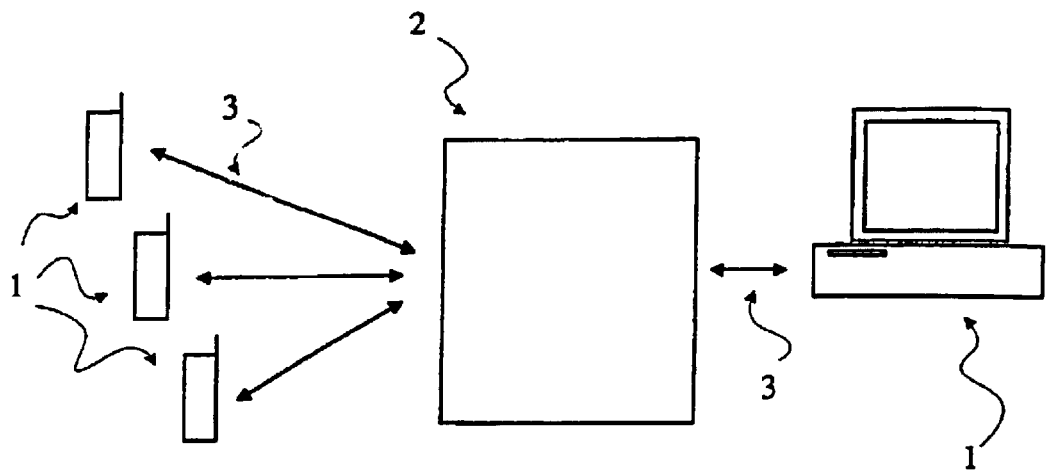

METHOD FOR CARRYING OUT QUESTIONNAIRE BASED SURVEY IN CELLULAR RADIO SYSTEM, A CELLULAR RADIO SYSTEM AND A BASE STATION

This application is the U.S. national phase of international application PCT/FI00/00847 filed Oct. 2, 2000 which designated the U.S.

The invention relates to a method for doing a questionnaire-based survey in a cellular radio system according to the preambles of the independent claims set forth below, as well as to a cellular radio system and a central device used in said method.

Questionnaire-based surveys are typically carried out by applying the diary method or as a personal interview survey. In this connection, the term questionnaire-based survey means a radio or television audience survey, an opinion poll, a study of tastes, a consumer survey, a marketing or customer awareness survey or another corresponding survey, carried out either locally or individually, where the interviewed person is asked one or several questions with alternative options for answers. The additional questions asked in the survey may be equal for all, or they may depend on the earlier answers given by each person. Moreover, it also is possible to accept an answer that is different from all the options given, or another answer that is typically free in from.

In a diary-type survey, the interviewee is given a diary-type answering form or book, where he/she writes his/her answers for instance during a week, for the questions typically remaining the same throughout the survey. For example television audience surveys are traditionally realized as a diary-type survey, where the interviewee writes down, during a predetermined period, facts of the TV channels and programs that he/she is tuned to, as well as the time and duration of the watching sessions. A drawback of this kind of diary-type survey is the slowness in obtaining the survey data as well as the laborious nature of collecting the data. Moreover, filling the diary is troublesome for the interviewee.

In order to speed up TV audience surveys and make them easier to be carried out, there are developed several different electrical control devices to monitor the watching of TV. The data collected by the control device is typically transferred to the researcher either as a real-time function or with longer intervals. For transferring the data between the control device and the researcher, there can be utilized a fixed TV network or a wireless communicator installed in the control device. A control device of the above described type is disclosed for instance in the patent publication U.S. Pat. No. 5,382,970. A drawback with this type of stationary control devices is their limited area coverage, i.e. they monitor the TV watching of the interviewee only in the particular spot where the device is installed. Moreover, it is both difficult and expensive to realize a survey in a large and versatile survey group where the results should possibly be obtained rapidly, because the device is costly to purchase and install, and the installation process takes time.

In order to eliminate the above described drawbacks, there are developed portable devices that are designed to be carried along by the person participating in the survey, which devices register the radio or TV programs followed by said person. For example in the patent application EP 0 606 703 A1, a method for performing radio and television audience surveys is disclosed. In the method described in said publication, each person participating in the survey is given a portable device that detects the identifier codes of the program broadcasts and registers this information in the memory. In the end of the survey, the devices are collected, and the data stored therein is decoded and analyzed. A drawback with the method illustrated in said publication is the need for a separate monitoring device that increases expenses, as well as the slow nature of the data collecting process.

It is well known that surveys are also done as personal interview surveys, where the questions are asked of the participant for example in a face to face situation. This type of survey, which is most often based on random sampling, is carried out rapidly, but the drawback is the survey method, which in practice is mostly based on random sampling. In that case either the general reliability of the survey, so as to cover the whole target group of said survey, is weakened, or the number of the interviewees must be increased up to a very large number in order to obtain a reliable and covering result. Moreover, a weakness of an interview survey is the labor-intensive nature in realizing the project.

The object of the present invention is to eliminate or at least alleviate the drawbacks of known methods and systems and to achieve an advanced method for realizing a questionnaire-based survey.

Thus the object is to realize a method for doing a questionnaire-based survey where the employed questionnaire and the optional answer alternatives are transferred to the participant by means of a cellular radio system.

A particular object of the invention is to realize a method where the transfer of the questionnaire and the optional answer alternatives is carried out by a well-known data transmission method according to the WAP (Wireless Application Protocol).

Yet another object of the invention is to realize a central device and a cellular radio system for carrying out the questionnaire-based survey.

In order to achieve the above mentioned objects, the method, central device and cellular radio system according to the invention are characterized by what is defined in the characterizing parts of the independent claims set forth below.

A typical method according to the invention for doing a questionnaire-based survey in a cellular radio system provided with a central device and a number of independent terminal devices, where in between the terminal devices and the central device there can be made data transmission connections, comprises steps where the central device receives an inquiry message and/or an inquiry table from the terminal device of the researcher, which message defines the survey group that is the target of the inquiry message, the central device detects which predetermined terminal device group and/or inquiry table stored in the central device is the target of the received inquiry message, the central device transmits a notice of a new, received inquiry message or at least part of the received inquiry message and/or a questionnaire to the terminal devices that belong to the target group of said inquiry message, the central device receives a questionnaire request at least from part of the terminal devices that received the earlier message but did not receive the questionnaire and transmits the questionnaire information for those terminal devices that requested it, the central device receives a response message corresponding to the questionnaire from at least part of the terminal devices that received the questionnaire and transmits at least part of the contents of the received response messages to the terminal device of the researcher.

The present invention is based on the inventive idea that by realizing a questionnaire-based survey by utilizing an existing cellular radio system, the survey can be made easily and rapidly in a desired target group having terminal devices that function in a cellular radio system, without a need for a separate survey equipment. In particular, it has now been realized that the WAP used in a cellular radio system enables two-way data transmission between the researcher and the participant. Thus the questions and optional answer alternatives can be formulated with respect to the earlier answers of the participant and on the basis thereof.

One of the advantages of the present invention, as compared with the known questionnaire-based survey methods and devices, is the fact that the method according to the invention offers a rapid and economical way to realize a locally and/or individually restricted survey, and as a result the obtained response is in a form that can be easily and rapidly processed further.

Figure 2:
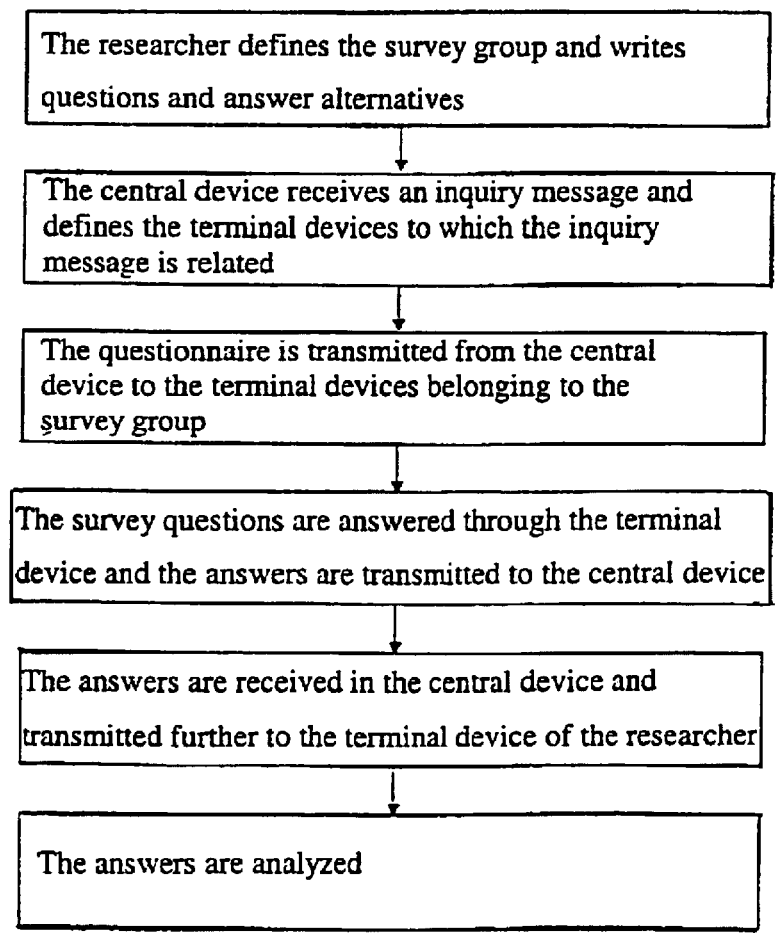

The invention is explained in more detail with reference to the appended drawings, where FIG. 1 is a schematical illustration of a cellular radio system, and FIG. 2 is a flowchart of a preferred embodiment of the method according to the invention for doing a survey.

FIG. 1 is a schematical illustration of a cellular radio system comprising several terminal devices 1 and a central device 2, in between which data transmission connections 3 can be made. In type, the terminal device 1 can be for example a telephone, a PDA (Personal Digital Assistant) or another device with means for making a data transmission connection between the terminal device and the central device, i.e. the terminal device can transmit and receive data transmission packets and has an individual identifier in order to identify said device. The central device 2 means a device or a program that is capable of passively waiting for communication requests from one or several terminal devices and of transmitting the requested data transmission packets to those terminal devices that requested them. The central device can also be capable of making a data transmission connection to one or several terminal devices in order to transmit a data transmission packet to said terminal devices. The invention makes use of known cellular radio systems, such as the GSM (Global System for Mobile Communication) and data transmission protocols, such as the WAP, SMS (Short Message Service) or the HTTP (HyperText Transfer Protocol), wherefore their technical features are not explained in more detail here.

In order to do a questionnaire-based survey, the researcher builds himself a required user group, i.e. a group that produces the data needed for carrying out the survey and that represents the target group of each survey in question. The user group can be built for instance by recruiting through newspaper advertisements and by giving the recruited participants the right to use the required terminal device. Said terminal device can be for example a mobile phone supporting the WAP. Another alternative is to give the target group members a set top box for receiving the TV signal, inside which set top box there is installed for instance a terminal device supporting the WAP, so that the compensation for participating in the survey is the right to use said set top box.

Another exemplary alternative for building a survey group is to recruit a group of people who already have a suitable terminal device, for instance a WAP telephone, in which case the expenses caused by the participation are compensated.

In addition, group members can be recruited for example by means of Internet pages, through which anybody who wishes to join the survey group can register as a candidate by giving his/her connections and identifiers of his/her terminal device, such as a telephone number. Thereafter the researcher transmits to the candidate all settings that are possibly required, for instance as a short message service (SMS), and the candidate records said information in his/her terminal device.

Group members can also be recruited for instance in cooperation with one or several radio stations. Participation can be encouraged by offering for example various prizes or chances to get prizes. One researcher may also have more than one survey group that he/she has recruited.

Survey group membership can be resigned in the same fashion as in the earlier known survey methods, i.e. at least some of the survey groups exist for a limited time only. In addition, a group member can resign the survey group by sending a notice to the researcher.

The information of the survey group members and their terminal devices can be recorded either in the terminal device of the researcher or in the memory of the central device used in the survey.

FIG. 2 is a flowchart illustrating an embodiment for realizing the questionnaire-based survey according to the invention by utilizing a cellular radio system. The researcher defines in his terminal device, for instance in his server, the survey group and hence the terminal device group that is the target of the survey, as well as the question or questions to be transmitted to the survey group, and transmits them to the central device, for instance to a WAP server. It also is possible that the server of the researcher serves simultaneously as a terminal device and as a central device. The central device receives a new inquiry message, investigates which terminal device group is the target of said message and transmits to said terminal devices a notice of a new question/questions and a questionnaire for instance by using the WAP. The survey group member sees in his/her terminal device, for example in a terminal device based on the WAP technology, said question and a menu where the different answer alternatives are given. The group member answers the given questions by selecting the alternatives that he/she thinks are correct, and finally transmits the answers back to the central device. The central device further transmits the selected answers to the terminal device of the researcher for analysis.

The above described survey can also be realized so that the central device transmits for the survey group terminal devices only a notice of a new question or questions, for example as a short message service (SMS), and after receiving a notice of a new question, each participant downloads the question from the central device in order to answer it.

All of the different terminal devices belonging to the survey group can be given identical alternatives for answers, or the answers can be modified according to each group member. Thus the survey can be realized for instance so that the question receiver sees in his/her terminal device those alternative answers that can be chosen in his/her particular geographical area. The geographical location can be defined either on the basis of some known piece of user information (which is for example collected in connection with recruitment, or represents the subscriber information stored in the SIM card in the terminal device) or information obtained from the location control of the cellular radio system itself. Thus there can for instance be realized a radio audience survey where the survey group members receive the question: "Which radio station are you tuned to?" and the answer alternatives given for the group members are the radio stations that broadcast in their particular geographical area.

The definition of the geographical location of the group members can also be utilized so that prior to sending a question to the survey group members, the central device can check the real location of the group members at the particular moment and transmit the question only to such terminal devices that fulfill the set criteria.

If the method according to the invention utilizes the WAP technology, the questions or question packets connected to the survey can be updated, customized according to the target group or changed daily directly in the central device, in which case the participant receives the accordingly changed version automatically in his/her terminal device after making a connection between the terminal device and the central device. An exclusive use of the SMS technology, on the other hand, requires that an updated, customized or changed question or question packet is always separately transmitted to the terminal device.

Moreover, the WAP technology makes it possible to store a survey base that is used several times (for instance in connection with election-connected opinion polls) in the cache memory of the terminal device, so that only the new answer is transmitted between the terminal device and the central device. A question or a question packet stored in the cache memory is visible for the user immediately after opening the inner browser of the terminal device used for data processing. For example, when using the SMS technology exclusively, the received question or question packet, or one to be received, is stored in similar fashion as other received SMS messages, either in the memory designed for storing terminal device messages, or alternatively in the memory of an element that is designed for identifying the terminal device or for making a connection (for example a SIM card).

Further, if the WAP technology is used in the present invention, it is possible to identify the receiver and/or answer on the basis of the IP number directly to the database, and respectively to send questions or question packets also on the basis of the IP numbers. In the SMS technology, the use of IP numbers is not possible, and identification can only take place on the basis of a telephone number that is transmitted along with the SMS message.

Moreover, the WAP technology enables the implementation of a protected connection in data transmission. The WTSL (Wireless Transport Layer Security) protocol is an SSL (Secure Sockets Layer) protocol designed particularly for narrow-band data transmission. In this connection, the use of said protocol in the method according to the present invention ensures, among others, the maintenance of data integrity, privacy, authentication and denial-of-service. Hence, by means of the WTSL protocol, it also is possible to make sure that data can be submitted only by the participants of the particular survey, i.e. those who have received the question or question packet. On the other hand, the protocol also makes it possible for the researcher to control the interface between the central device and the terminal devices. For instance in the SMS technology, a similar protocol as the WTSL is not available.

A technology according to the WAP also makes it possible to ask so-called multilevel or multioption questions. When the participant makes a connection to the central device with his/her terminal device, the central device can ask multilevel questions, where a given answer (A . . . X) leads to a given follow-up question (b1 . . . bn) on a second level, and a given answer on the second level again leads to a given answer (c2 . . . c2) on a third level, and so on (on . . . on). From the user's point of view, this system means that the user does not have to remember the answers given on the preceding levels, but the central device always guides the user to the next level according to the answer given on the previous level. It is not possible to realize a similar method by means of the SMS technology, or by means of traditional questionnaire-based survey forms.

In addition to this, the WAP technology enables, by means of questions installed in the central device from the terminal devices, an extremely rapid data collection, and by means of the analyzing programs installed in the central device, an extremely rapid analysis and reporting on the obtained results. In comparison with the current methods for collecting survey material described above, such as a telephone interview or a diary, the data collection and analysis by utilizing the WAP technology is remarkably faster. The arrangement according to the present invention makes it possible to theoretically present the results of a survey including even thousands of answers after a few minutes only—in practice, if required, within an hour from starting the survey, and in any case within 24 hours. Traditional survey methods, even at their fastest, produce analyzed answers in about a week.

When necessary, the WAP technology makes it possible to report on the obtained results in a real-time connection and by utilizing the Internet technology through an Internet page opened for the subscriber of the research as well as by means of a terminal device based on the WAP technology. The SMS technology does not enable a long-standing and continuous connection, and hence it is not possible to present the results in real time through SMS terminal devices.

Furthermore, the WAP technology enables the use of an identifier (cf. also WTLS above) that is based on a telephone number, an IP number or another individual identifier (for instance a subscriber code), whereby it is possible, in the central device, both to identify the participant and to control the participation of said participant. Because a terminal device that is based on the WAP is in continuous connection with the central device, the identifier can be used for actively preventing the participant from erroneously participating several times in the same question already when making the connection, in which case the central device, instead of sending a question or a question packet, transmits to the terminal device a message for example in the form "You already have participated this interview". A similar system is not possible when using the SMS technology, because a SMS terminal is not in continuous connection with the central device.

The survey results collected according to the methods described above typically include at least part of the following information:

- the demographic information of the participant, obtained either from the register data of the participant or from the register data of the identifier provided in the terminal device of the participant, i.e. for example from the register data of the SIM card,
- the geographical location of the submitted answer is based on the register data or on the location information produced by the cellular radio system,
- the given answers to the questions, and
- the point of time when the answer was given, based on the point of transmitting the answer.

Thus the data received by the researcher can be analyzed and collected for instance as an audience survey or as an opinion poll.

The present invention is not meant to be restricted to the exemplary embodiments that are described above; on the contrary, it is meant to be widely interpreted within the scope of the appended claims.

What is claimed is:

1. A method for making a questionnaire-based survey in a cellular radio system comprising the steps of:

(a) providing a central device and a number of independent wireless terminal devices operable in the cellular radio system, where data transmission connections for transmitting data transmission packets are made between the wireless terminal devices and the central device, wherein the method comprises the steps of:

(b) allowing the central device to receive an inquiry message and/or an inquiry table from the wireless terminal device of the researcher, said message defining the target survey group of the inquiry message, (c) causing the central device to investigate which predetermined wireless terminal device group and/or inquiry table stored in the central device is the target of the received inquiry message, (d) transmitting a notice of a new received inquiry message or at least part of the received inquiry messages and/or the questionnaire from the central device to the wireless terminal devices that belong to the target group of the received inquiry message, (e) allowing the central device to receive a questionnaire request from at least part of such wireless terminal devices that received the message but did not receive the questionnaire, and to transmit the questionnaire information to those wireless terminal devices that requested it, (e) allowing the central device to receive an answer message corresponding to the questionnaire from at least part of the wireless terminal devices that received the questionnaire, and to transmit at least part of the contents of the received answer messages to the wireless terminal device of the researcher.

2. A method according to claim 1, wherein the central device forms a terminal device group by picking, from the definition message received from the terminal device of the researcher, information of the terminal devices that form the terminal device survey group.

3. A method according to claim 1, wherein the central device forms a terminal device group by picking, from the message received from the terminal device of the researcher, information of the terminal device and knowledge as to which terminal device group or groups the terminal device in question belongs.

4. A method according to claim 1, wherein the terminal device forms a terminal device group by picking, from the message received from a terminal device joining in the survey group, information of the joining terminal device and of the survey group or groups that said terminal device is joining.

5. A method according to claim 1, characterized in that the central device defines, on the basis of the inquiry message, a survey group that the inquiry message relates to by identifying from the message a reference to a terminal device group stored in the central device.

6. A method according to claim 1, wherein the central device transmits a notice of a new inquiry message to the terminal devices belonging to the terminal device group as an SMS message through the terminal devices.

7. A method according to claim 1, wherein a questionnaire is formed individually for each terminal device on the basis of the questions and the connected answer alternatives, said answer alternatives being formed on the basis of the terminal device location information from among a group of predetermined alternatives.

8. A method according to claim 7, wherein the employed terminal device location information is the SIM card subscriber information or the register information of the terminal device in the survey group.

9. A method according to claim 7, wherein the employed terminal device location information is the real geographical location of the terminal device.

10. A method according to claim 9, wherein the real location of the terminal device is determined by means of a GPS satellite and/or the location system of the cellular radio system itself.

11. A method according to claim 1, wherein the questionnaire is transmitted to the terminal devices by using the WAP.

12. A method according to claim 1, wherein at least part of the terminal devices belonging to the terminal device group are located in connection with signal converters designed for receiving programs that are broadcast in a cable or a satellite network.

13. A central device for doing a questionnaire-based survey in a cellular radio system including, in addition to said central device, a number of independent wireless terminal devices, said central device comprising:

data transmission means to allow the central device to establish data transmission connections with the wireless terminal devices for transmitting data transmission packets via a cellular radio system, elements for receiving a message defining wireless terminal device groups, an inquiry message and/or a questionnaire from a wireless terminal device, memory elements for recording definitions regarding the wireless terminal device groups, elements for investigating to which predetermined wireless terminal device group a given received inquiry message relates to, transmitter elements for transmitting a notice of the received inquiry message or at least part of the received inquiry message and/or the questionnaire to the wireless terminal devices belonging to the wireless terminal device group that the received inquiry message relates to, elements for receiving a questionnaire request from at least part of the wireless terminal devices that received the inquiry message, but did not receive the questionnaire, and for transmitting questionnaire data to the requesting wireless terminal devices, receiver elements for receiving an answer message responding to the questionnaire from at least part of the wireless terminal devices that received the questionnaire, and transmitter elements for transmitting at least part of the contents of the questionnaire answer messages to the wireless terminal device of the researcher.

14. A cellular radio system including a central device and a number of independent wireless terminal devices, wherein between the wireless terminal devices and the central device, data transmission connections for transmitting data transmission packets are made, and wherein said system further includes survey-distribution means for distributing a questionnaire-based survey, said survey-distribution means comprising:

means for transmitting a message defining wireless terminal device groups, an inquiry message or a questionnaire from the terminal device of the researcher to the central device, the message including a definition as to the target terminal device group of said message, memory elements for recording definitions regarding the wireless terminal device groups, elements for investigating to which predetermined wireless terminal device group a given message transmitted from the terminal device of the researcher to the central device relates to, elements for transmitting a notice of the received inquiry message or at least part of the received inquiry message and/or the questionnaire from the central device to such wireless terminal devices belonging to the wireless terminal device group that the received inquiry message relates to, elements for transmitting to the central device the questionnaire request obtained from at least part of the wireless terminal devices that received the message but did not receive the questionnaire, and for transmitting questionnaire data from the central device to the requesting wireless terminal devices, elements for transmitting an answer message responding to the questionnaire from at least part of the wireless terminal devices that received the questionnaire to the central device, and elements for transmitting at least part of the contents of the answer messages responding to the questionnaire from the central device to the wireless terminal device of the researcher.

* * * * *